United States Patent
Hui et al.

(10) Patent No.: US 9,391,784 B2
(45) Date of Patent: Jul. 12, 2016

(54) COMPUTING RISK-SHARING METRICS IN SHARED-MEDIA COMMUNICATION NETWORKS

(75) Inventors: Jonathan W. Hui, Foster City, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 13/403,023

(22) Filed: Feb. 23, 2012

(65) Prior Publication Data

US 2013/0223225 A1 Aug. 29, 2013

(51) Int. Cl.
| | |
|---|---|
| H04L 12/10 | (2006.01) |
| H04L 12/24 | (2006.01) |
| H04L 29/08 | (2006.01) |
| H04W 4/00 | (2009.01) |

(52) U.S. Cl.
CPC ............ *H04L 12/10* (2013.01); *H04L 41/0836* (2013.01); *H04L 41/147* (2013.01); *H04L 41/142* (2013.01); *H04L 67/12* (2013.01); *H04W 4/005* (2013.01); *H04W 4/006* (2013.01)

(58) Field of Classification Search
CPC .............. H04L 41/04–41/048; H04L 41/0654; H04L 41/0659; H04L 41/0663; H04L 41/0668; H04L 41/0677; H04L 41/0681; H04L 41/0686; H04L 41/069; H04L 41/0695; H04L 41/0853; H04L 41/0869; H04L 41/0873; H04L 41/142; H04L 41/145; H04L 41/147

USPC ................. 370/216–248, 250–252, 254–256, 370/400–401, 406, 410
See application file for complete search history.

(56) References Cited

U.S. PATENT DOCUMENTS

| | | | |
|---|---|---|---|
| 7,042,838 B1 * | 5/2006 | Shand et al. ................... | 370/225 |
| 7,453,795 B1 * | 11/2008 | Pan et al. ....................... | 370/216 |
| 2007/0211732 A1 * | 9/2007 | Suemura ........................ | 370/400 |
| 2009/0103442 A1 * | 4/2009 | Douville ........................ | 370/248 |
| 2009/0285574 A1 * | 11/2009 | Liu .................................. | 398/2 |

OTHER PUBLICATIONS

Winter, et al., "RPL: IPv6 Routing Protocol for Low Power and Lossy Networks", draft-ietf-roll-rpl-19, IETF Internet-Draft; Mar. 2011, 164 pages.

* cited by examiner

*Primary Examiner* — Michael Thier
*Assistant Examiner* — Eric Myers
(74) *Attorney, Agent, or Firm* — Parker Ibrahim & Berg LLC; James M. Behmke; Stephen D. LeBarron

(57) ABSTRACT

In one embodiment, a routing node determines a risk-sharing metric between pairs of nodes in a shared-media communication network, and may then compute a plurality of routes that minimizes the risk-sharing metric between the routes, to correspondingly route traffic according to the computed plurality of routes. Additionally, in another embodiment, a particular node in the shared-media communication network may determine a risk-sharing metric between itself and each of one or more other nodes in the shared-media communication network. The particular node may then share the one or more determined risk-sharing metrics with one or more routing nodes in the shared-media communication network, accordingly.

20 Claims, 12 Drawing Sheets

COMPUTING RISK-SHARING METRICS IN SHARED-MEDIA COMMUNICATION NETWORKS

TECHNICAL FIELD

The present disclosure relates generally to computer networks, and, more particularly, to risk-sharing between nodes in shared-media communication networks.

BACKGROUND

Shared-media communication networks, such as wireless networks or power-line communication (PLC) networks (a type of communication over power-lines), provide an enabling technology for networking communication. Shared-media, however, is generally a physical medium that is strongly affected by environmental conditions that change over time. Some examples include temporal changes in interference (e.g., other wireless networks or electric appliances), physical obstruction (e.g., doors opening and/or closing or seasonal changes in foliage density of trees), and propagation characteristics of the physical media (e.g., temperature or humidity changes). The time scales of such temporal changes can range between milliseconds (e.g., transmissions from other wireless networks) to months (e.g., seasonal changes of outdoor environment).

To address these challenges, routing protocols operating in shared-media environments typically select multiple routes to form robust paths towards a destination. By having each node maintain multiple routes, a device may quickly retransmit packets using different links in case transmission failures occur. Existing routing protocols currently generally select routes that minimize a specified cost (e.g., hop count or Estimated Transmission Count (ETX), etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
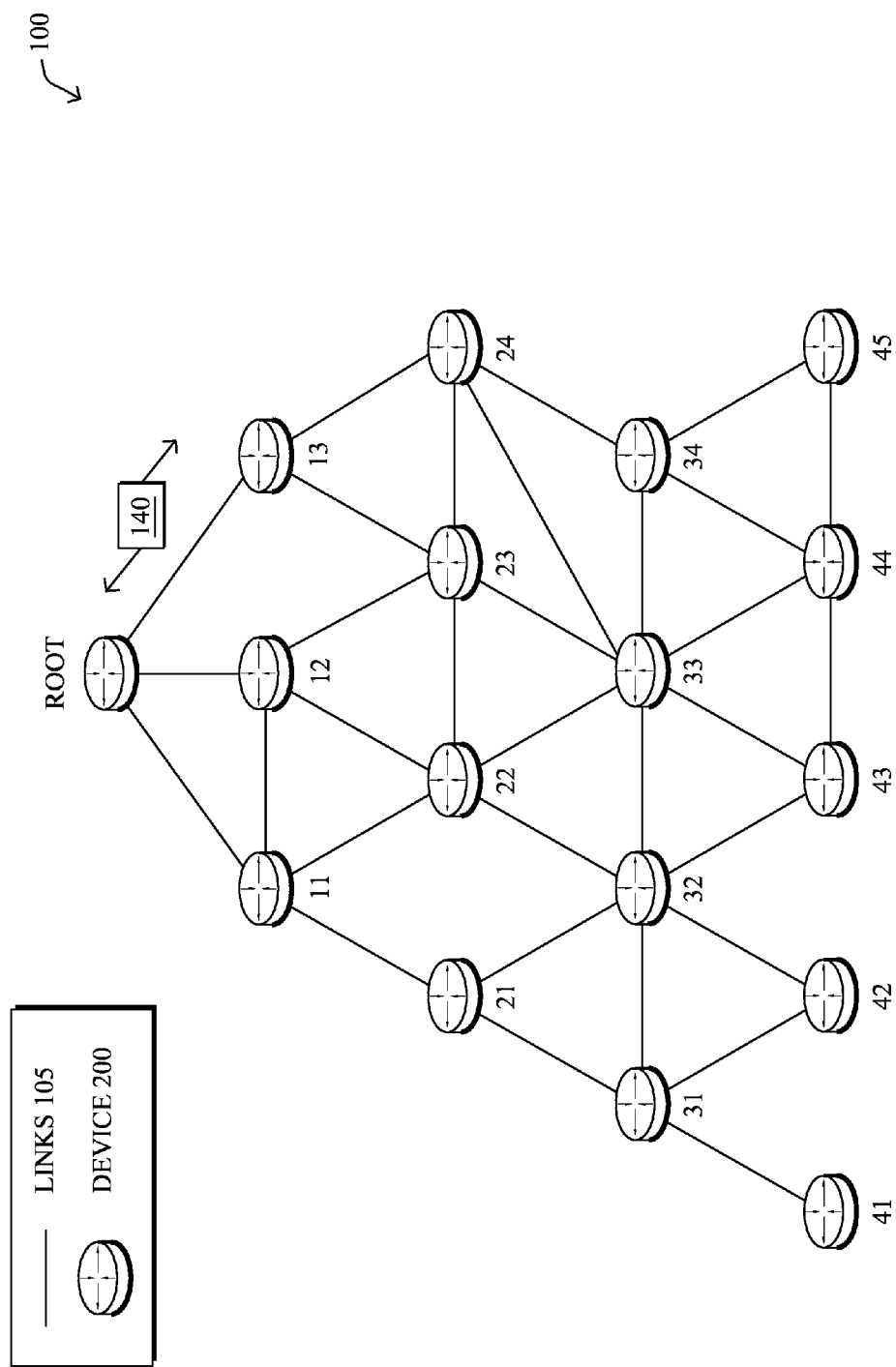
FIG. 1 illustrates an example communication network.

According to one or more embodiments of the disclosure, a routing node determines a risk-sharing metric between pairs of nodes in a shared-media communication network, and may then compute a plurality of routes that minimizes the risk-sharing metric between the routes, to correspondingly route traffic according to the computed plurality of routes. Additionally, according to one or more embodiments of the disclosure, a particular node in the shared-media communication network may determine a risk-sharing metric between itself and each of one or more other nodes in the shared-media communication network. The particular node may then share the one or more determined risk-sharing metrics with one or more routing nodes in the shared-media communication network, accordingly.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth. Correspondingly, a reactive routing protocol may, though need not, be used in place of a proactive routing protocol for smart object networks.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
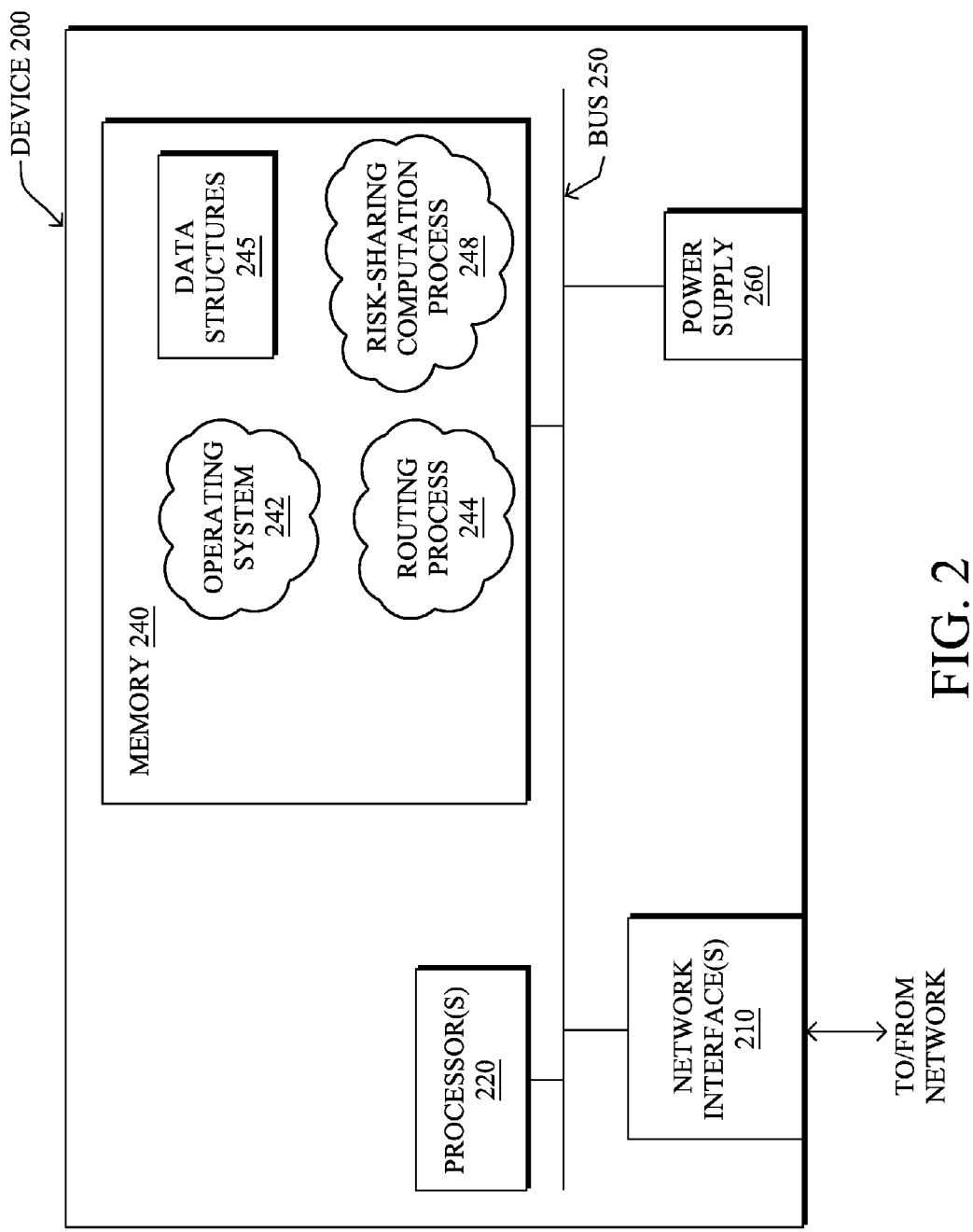
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise necessary elements or logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244, and an illustrative risk-sharing computation process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Internet Draft, entitled "RPL: IPv6 Routing Protocol for Low Power and Lossy Networks" <draft-ietf-roll-rpl-19> by Winter, et al. (Mar. 13, 2011 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by routing process 244 and/or a specific DAG process) based on an Objective Function (OF). The role of the Objective Function is generally to specify rules on how to build the DAG (e.g. number of parents, backup parents, etc.).

Figure 3:
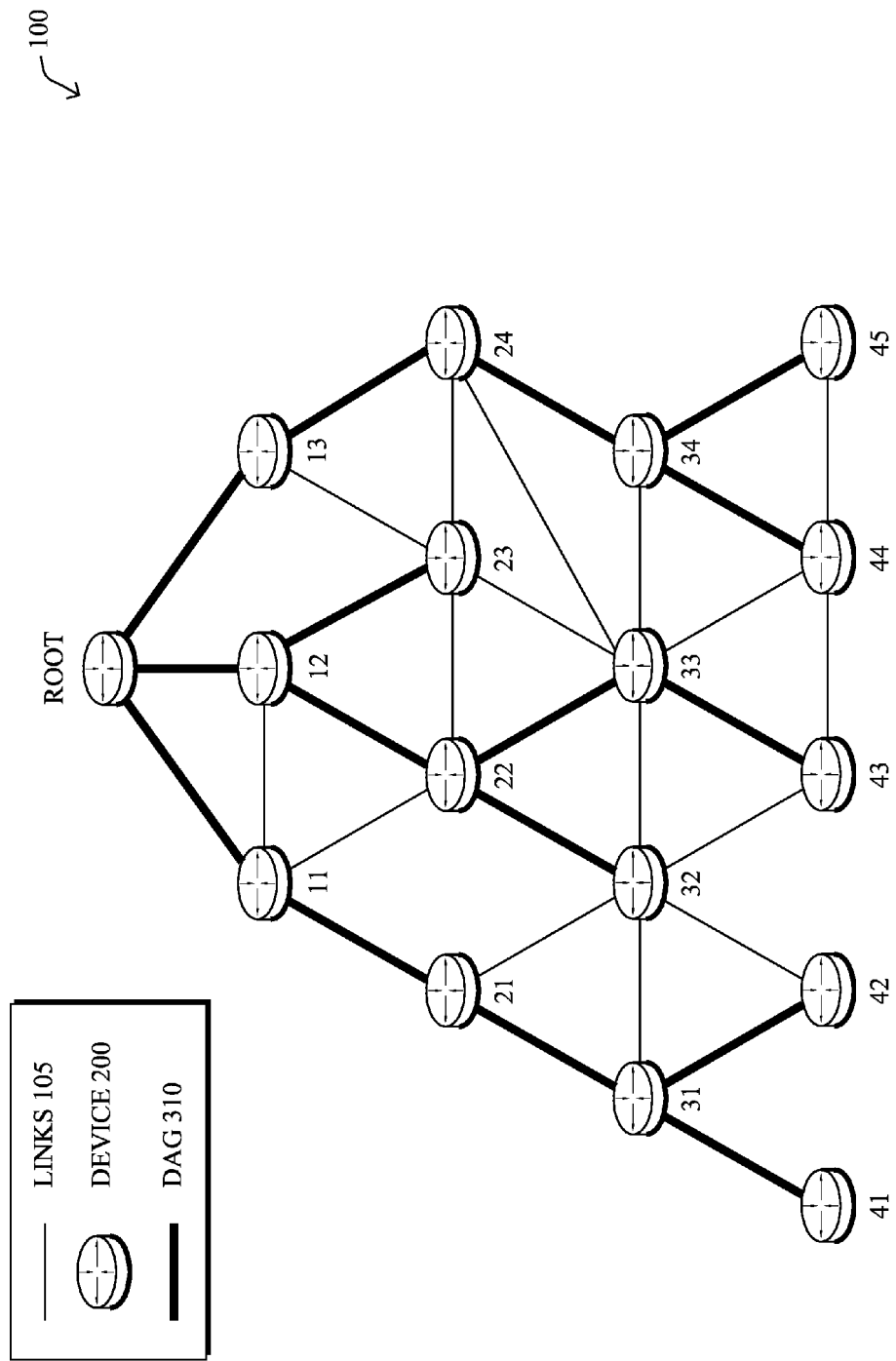
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as solid bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein. In addition, the creation of the DAG may also provide for one or more alternate parents (next-hops), such as those shown in the dashed bolded lines, accordingly. Note that while a DAG 310 is shown, other routing topologies may be created, and a DAG is merely one example of a routing protocol topology that may be created and utilized according to the techniques described herein.

As noted above, shared-media communication networks, such as wireless networks or power-line communication (PLC) networks, provide an enabling technology for networking communication. Shared-media, however, is generally a physical medium that is strongly affected by environmental conditions that change over time. Some examples include temporal changes in interference (e.g., other wireless networks or electric appliances), physical obstruction (e.g., doors opening and/or closing or seasonal changes in foliage density of trees), and propagation characteristics of the physical media (e.g., temperature or humidity changes). The time scales of such temporal changes can range between milliseconds (e.g., transmissions from other wireless networks) to months (e.g., seasonal changes of outdoor environment).

To address these challenges, routing protocols operating in shared-media environments, such as LLNs/IoT networks, typically select multiple routes to form robust paths towards a destination. For instance, the ability to build diverse paths is important for the Internet of Things (IoT) for a number of critical/real-time applications where "1+1" techniques consisting of duplicating critical packets and sending them along diverse paths is a strong requirement. Indeed, for such packets, links are so lossy that sending a single copy along a path has a high probability of being lost (and being retransmitted, which involves additional delays), especially when the path diameter increases, particularly since the path's Packet Error Rate increases exponentially with the path length. In addition to "1+1" protection (where two diverse packets are sent, one on the primary path and one on the/each diverse path), "1:1" protection is also available where the diverse path(s) is/are used only in response to detecting a failure of the primary path. That is, in "1:1" protection, by having each node maintain multiple routes, a device may quickly retransmit packets using different links in case transmission failures occur.

The computation of diverse paths is a well-known technical challenge in networks using distance vector routing protocols. Existing routing protocols, however, currently generally select routes that only minimize a specified cost (e.g., hop count or Estimated Transmission Count (ETX), etc.). In particular, these existing solutions do not address another important characteristic of shared-media link technologies. For instance, shared-media link technologies (including both wireless and PLC) communicate using a shared physical medium where links are susceptible to interference, such as where simultaneous transmissions from devices in the same network can disrupt each other, etc. However, as mentioned, shared-media link technologies are also susceptible to external interference, such as where changes in environment and spurious noise can disrupt transmissions within the network.

Both external and internal interference generally have a high spatial locality, that is, the interference affects devices within physical proximity of the interference source. An example form of internal interference is a device transmitting, which affects all other devices within transmission range. An example form of external interference is an electronic device emitting spurious noise. In both examples, the interference source only affects those devices within close physical proximity. In general, the magnitude of the interference decreases with distance from the source.

Risk-Sharing Metrics

Risk sharing (or fate sharing) is defined herein as a metric that conveys how likely two (or more) devices may be affected by the same sources of internal and external interference. Generally, devices that are nearby in physical proximity are more likely to be affected by the same kinds of internal and external interference. As a result, devices nearer to each other may generally have a higher risk-sharing cost than devices that are further away from each other. While existing routing protocols do select multiple routes, they rarely select them in a manner that attempts to reduce the cost of risk sharing.

The techniques herein introduce a risk-sharing metric (cost) and a localized mechanism for computing that metric and utilizing it when choosing routes. Notably, the techniques do not merely specify another routing metric, but also specify how a node assesses the degree of risk sharing between links in shared-media environments. For example, as described herein, nodes in a physical proximity may exchange information related to geographical position or signal strength so as to provide information on the risk sharing between the nodes. Thus, in contrast with other approaches, the techniques herein obtain such information from neighbors, since information local to the route-computing node itself may not be sufficient to make an appropriate choice.

Specifically, according to one or more embodiments of the disclosure as described in detail below, a routing node determines a risk-sharing metric between pairs of nodes in a shared-media communication network, and may then compute a plurality of routes that minimizes the risk-sharing metric between the routes, to correspondingly route traffic according to the computed plurality of routes. Additionally, according to one or more embodiments of the disclosure as described in detail below, a particular node in the shared-media communication network may determine a risk-sharing metric between itself and each of one or more other nodes in the shared-media communication network. The particular node may then share the one or more determined risk-sharing metrics with one or more routing nodes in the shared-media communication network, accordingly.

Illustratively, the techniques described herein may be performed by hardware, software, and/or firmware, such as in accordance with the risk-sharing computation process 248, which may contain computer executable instructions executed by the processor 220 to perform functions relating to the techniques described herein, e.g., in conjunction with routing process 244. For example, the techniques herein may be treated as extensions to conventional routing protocols, such as the illustrative RPL protocol, and as such, may be processed by similar components understood in the art that execute those protocols, accordingly. (Note that RPL is merely an example routing protocol, and the embodiments herein are not limited to use with the RPL protocol, accordingly.)

Operationally, the first component of the techniques herein consists of the risk-sharing metric itself. The general purpose of the risk-sharing metric is to allow comparisons between different pairs of links. In particular, two devices that are more likely to be affected by the same sources of external and internal interference would have a higher risk-sharing cost than two devices that are less likely to be affected by the same sources of external and internal interference.

Figure 4:
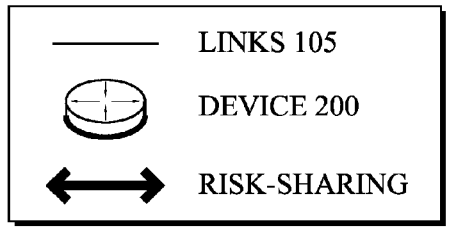
FIG. 4 illustrates an example of risk-sharing.
Figure 4:
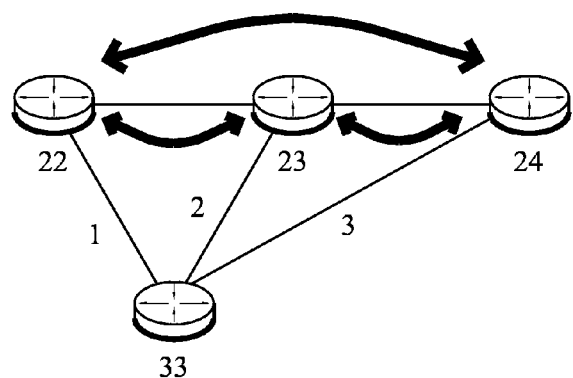

For the purposes of routing, a device typically compares links between itself and its neighbors. For example, as shown in FIG. 4, a device (e.g., node 33) may attempt to select two routes among three neighbors, e.g., nodes 22, 23, and 24 (over links 1-3, respectively). When using the risk-sharing metric to select between routes, node 23 determines the risk-sharing cost between link 1 and link 2, link 2 and link 3, and link 1 and link 3. The routing device (node 33) may then select the pair of links that has the lowest risk-sharing cost, in addition to potentially other routing metrics and constraints. In doing so, the device increases the overall network robustness by selecting routes that are less likely to be affected by the same sources of interference. Without such notion, the use of backup next hops may be essentially ineffective.

Figure 5:
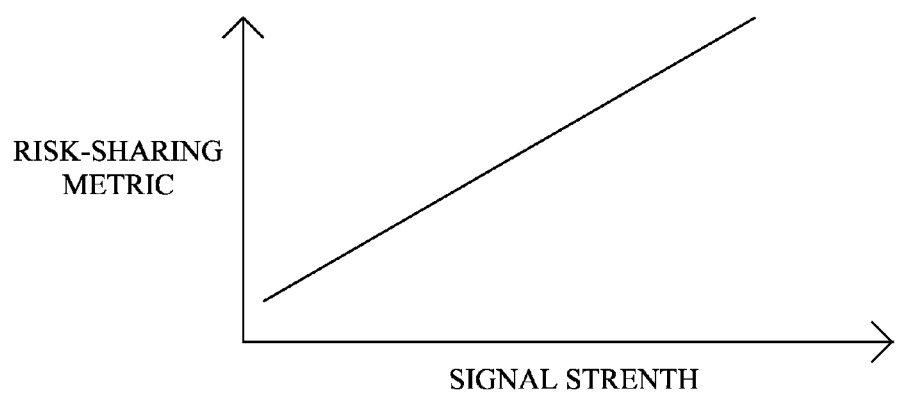
FIG. 5 illustrates an example of risk-sharing metrics in relation to signal strength.
Figure 6:
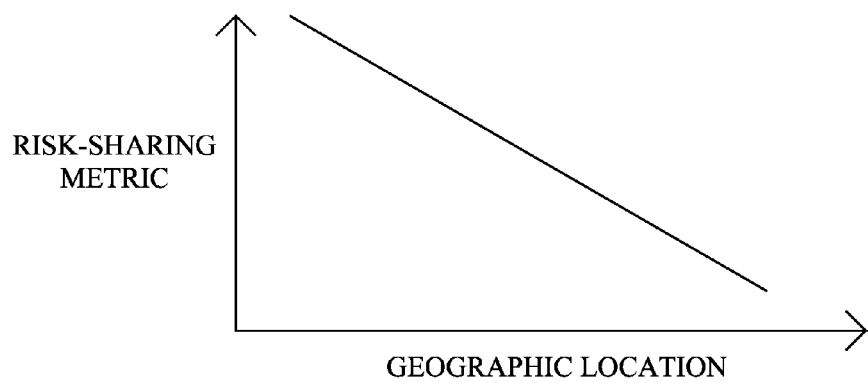
FIG. 6 illustrates an example of risk-sharing metrics in relation to geographical distance.

The risk-sharing metric may be computed in a number of ways based on the information available to the devices. In one embodiment, for instance, the risk-sharing metric may be some approximation of distance. That is, because the strength of interference generally degrades with distance, using some approximation of distance may be useful to determine the risk-sharing cost. For example, when using Received Signal Strength Indication (RSSI) values, two devices that have a lower RSSI have a correspondingly lower risk-sharing cost value. Said differently, with reference to FIG. 5, by determining a signal strength between the nodes, the risk-sharing metric may be computed as a value proportional to the corresponding signal strength. Another example involves using geographic coordinates (e.g., obtained via GPS or configured at installation time), and two devices that are further apart have a lower risk-sharing cost value. That is, with reference to FIG. 6, by determining a geographical distance between the nodes, the risk-sharing metric may be computed as a value inversely proportional to the corresponding geographical distance.

Figure 7:
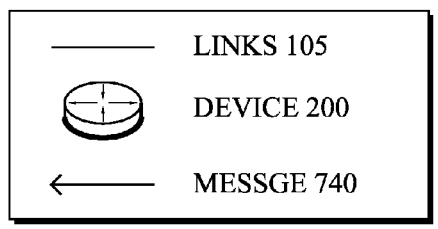
FIG. 7 illustrates an example of risk-sharing metrics based on noise event correlation.
Figure 7:
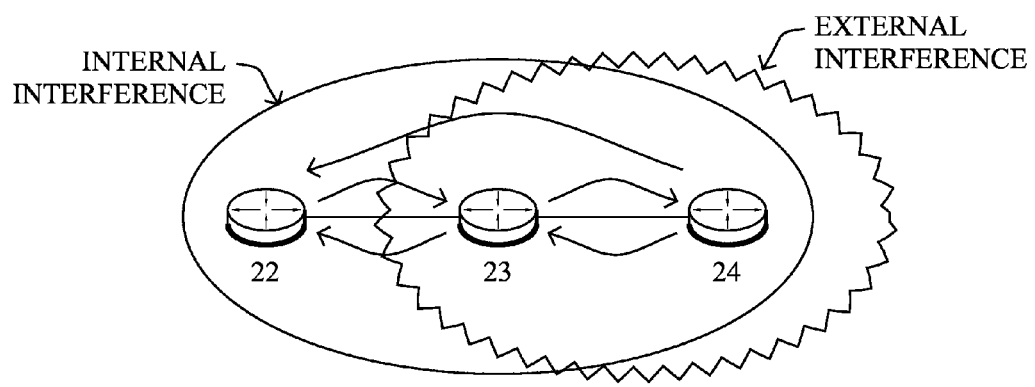

In another embodiment, the risk-sharing metric may be based on observed behaviors correlated in time. For example, with reference to FIG. 7, devices may continuously monitor the shared-media (e.g., the channel) and record any interesting noise events, such as conventional noise (e.g., from shared-media transmissions, such as from node 23) or simply "unusual" spikes in noise (such as some noise detected by nodes 23 and 24). Devices can then periodically exchange these events (messages 740) to determine whether other devices are experiencing similar events at the same time, thus determining the risk-sharing metric for other nodes by correlating the received noise event notifications 740. The devices may choose to exchange such data with their neighbors or disseminate with all other devices in the network. The specific choice depends on the frequency of such events and how far reaching the interference effects may occur. In one embodiment, for example, the network may switch between the different modes depending on the amount of channel capacity available, interference event reports, and geographic extent of correlated events.

Note also that in general the set of nodes for which risk-sharing metrics is determined may be simply next-hop neighbor nodes, "n-hop" neighbor nodes (nodes a certain hop distance away, e.g., two, which may help correlate "hidden nodes," where an interference may occur between two nodes that don't normally "see" each other), reachable neighbor nodes (e.g., visible), or else all nodes of the communication network.

Another component of the techniques described herein involves how devices obtain/discover the risk-sharing metric values for neighbor pairs. In particular, while the risk-sharing metric provides a cost value for two links of a device (e.g., link 1 and link 2 for node 33), and thus two corresponding neighbors (e.g., node 22 and node 23), the real relationship is between those two devices (node 22 and node 23) directly. As a result, it is much more natural for node 22 and node 23 to determine the risk-sharing cost between each other and provide that information back to the routing node (node 33). For example, when using approximate distance to compute the risk-sharing metric, it is the distance between node 22 and node 23 that is important, not to node 33. Indeed, if both node 22 and node 23 have a high risk of fate sharing, a single source of perturbation may affect both link 1 and link 2 (links 33-22 and 33-23).

Figure 8A:
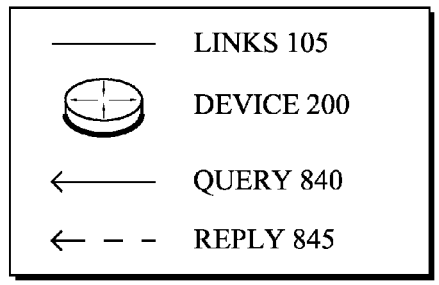
FIGS. 8A-8B illustrate an example query exchange.
Figure 8A:
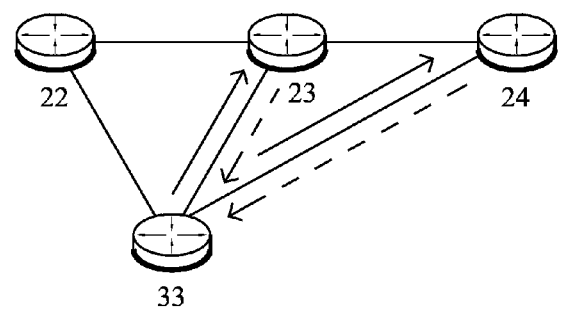

According to one or more embodiments herein, therefore, devices compute and maintain risk-sharing cost values to neighboring nodes within a certain proximity, and share the determined risk-sharing metrics with routing nodes (e.g., other nodes, or head-end applications) in the shared-media communication network. One manner to share the metrics is through a querying exchange, as illustrated in FIG. 8A. As shown, a routing node (e.g., node 33) may query (send requests 840) to one or more nodes for their locally determined risk-sharing metrics between pairs of their neighbor nodes. For example, when node 33 wants to know the risk-sharing cost between node 23 and node 24, node 33 can send a query message 840 to node 23 and/or node 24 requesting the risk-sharing cost between them, carried in a response/reply message 845.

Figure 8B:
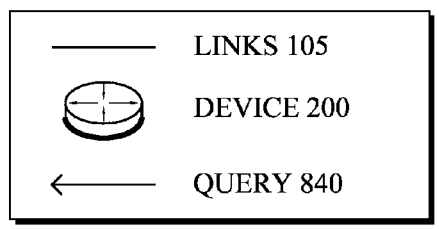
Figure 8B:
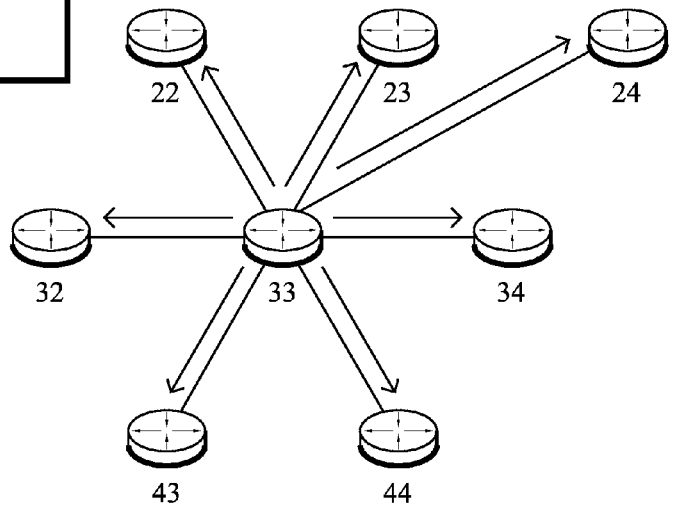

Note that the selection of which nodes receive the query may be based on a particular direction (e.g., all nodes closer to the root), or else a preferred node may be selected for a first computed route (e.g., node 23), such that querying of the preferred node is to obtain the preferred node's locally determined risk-sharing metrics between pairs of its neighbor nodes (e.g., node 22 and node 24). Alternatively, such as in environments where the density is not too high, the node may send link local messages requesting the risk-sharing metric from each of its neighbors to their own neighbors, as shown in FIG. 8B, and may then filter out the link(s) of interest. Note also that the query may simply request metrics for all neighbors, or may include a specified subset of neighbors for which the metrics are requested.

Figure 9:
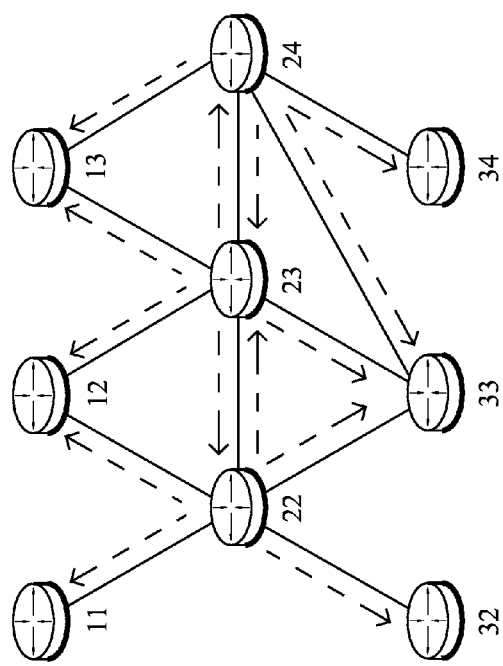
FIG. 9 illustrates an example advertisement exchange.
Figure 9:
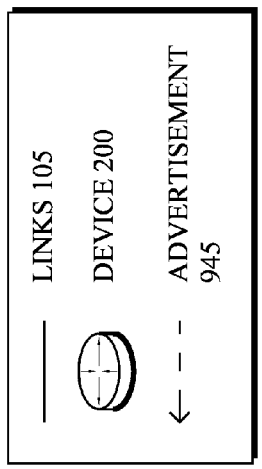

In another embodiment, as shown in FIG. 9, advertisements 945 may be sent and received from nodes in the shared-media communication network that relay the associated risk-sharing metric between corresponding pairs of neighbor nodes of the respective node sending the advertisement.

In yet another embodiment nodes send risk-sharing information to their neighbors should the value have changed significantly in an unsolicited fashion. That is, regardless of whether it was queried or advertised, updates to the risk-sharing metric between a particular pair of nodes may be sent/received in response to that risk-sharing metric changing by a threshold amount.

According to one or more additional embodiments herein, routing nodes may optionally delegate the risk-sharing metric selection to their neighbors. For instance, while the embodiments above involve having a routing device collecting the risk-sharing metric values from neighboring nodes, and then selecting the link pairs (routes) that minimize the risk-sharing metric, in this alternative embodiment, the routing device may send a list of link pairs and ask the neighbor to only return those pairs that minimize the risk-sharing metric.

Figure 10:
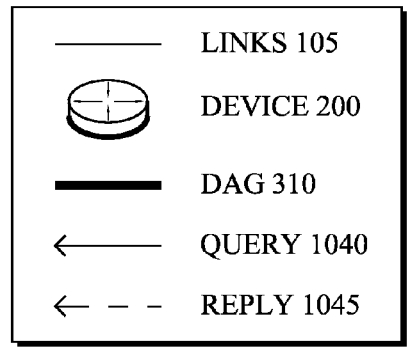
FIG. 10 illustrates an example least-risk-shared selection delegation.
Figure 10:
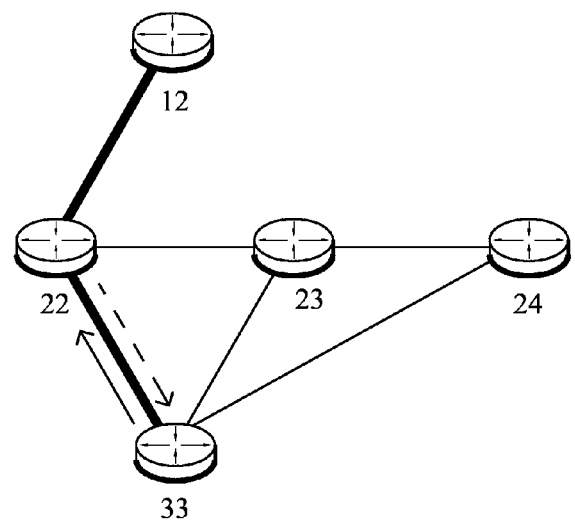

For instance, as shown in FIG. 10, assume that routing node 33 decides to send a query 1040 to node 22 for one or more of its locally determined least-risk-shared neighbor nodes, e.g., specifically indicating node 23 and node 24 (a subset of nodes from which the queried nodes are to select their locally determined least-risk-shared neighbor nodes). Node 22 may then determine the least-risk-shared node (e.g., node 24), and sends a reply 1045 with the node that provides the minimum risk-sharing cost. As noted above, the routing node 33 may have first selected a preferred node for a first computed route (e.g., shown as a portion of the DAG 310), thus node 22 was queried in order to find a secondary route that is least-risk-shared with the primary route (DAG 310).

This delegation technique may be preferable in certain situations because of its lower communication complexity. Also, in environments where a device has a strong preference for one of its neighbors (possibly due to other considerations such as ETX, throughput, or constraints), the device may simply ask its preferred next-hop to select among a list of devices that minimizes the risk-sharing cost for the alternate routes.

Figure 11:
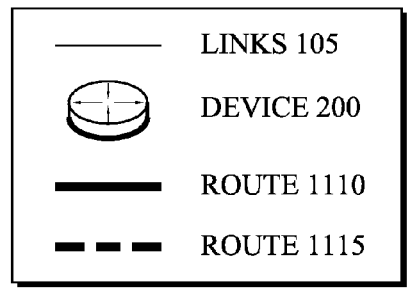
FIG. 11 illustrates an example route selection based on risk-sharing metrics.
Figure 11:
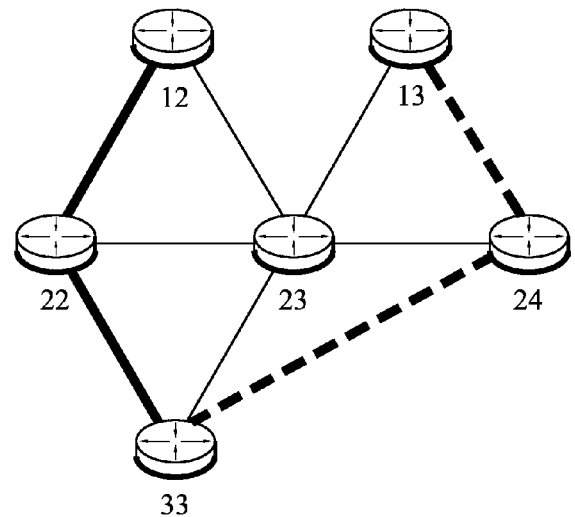

Having determined a risk-sharing metric between pairs of nodes in a shared-media communication network, the routing device can then compute/select a plurality of routes that minimize the risk-sharing metric between the routes. For example, as shown in FIG. 11, a first route 1110 from node 33 may utilize node 22, while a second route 1115 may utilize node 24, assuming that out of links 1, 2, and 3, links 1 and 3 had the least level of risk-sharing metric between them. This route computation may continue to the destination (e.g., the root or other device), such that the risk-sharing metrics along an entire route/path are compared in order to minimize the total metric (along with other routing metrics). These routes may then be used to route traffic, such as when utilizing a redundant protection scheme such as 1+1 protection or 1:1 protection.

Figure 12:
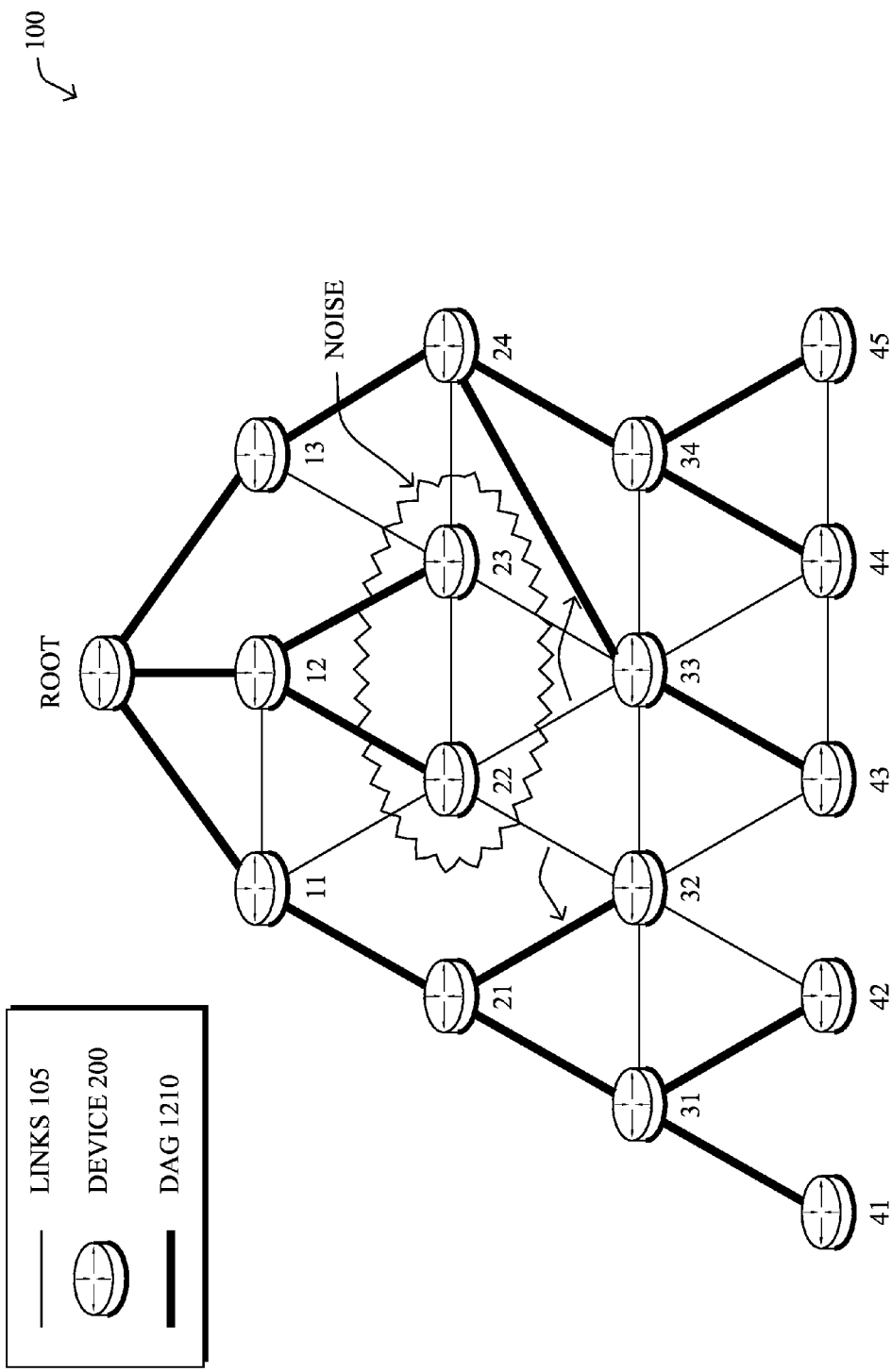
FIG. 12 illustrates an example routing topology (e.g., DAG) based on risk-sharing metrics.

In addition, when building a network topology (e.g., a DAG), nodes currently only take conventional cost metrics and constraints into account, and have no visibility on the noise factor that creates risk/fate sharing. The techniques herein may thus quantify that noise and its impact, and may factor such risk/fate sharing in the next-hop selection of a routing topology. For example, as shown in FIG. 12, a new DAG 1210 may be established that attempts to minimize the occurrence of high-risk locations, which may be determined through the noise event notifications mentioned above. Note that though the techniques may be used to establish primary and secondary DAG paths from each node that minimize the risk-sharing metrics between the two DAG paths (or two DAGs), this particular illustration demonstrates how it may be possible to create a primary DAG that also accounts for noisy areas of the DAG.

Figure 13:
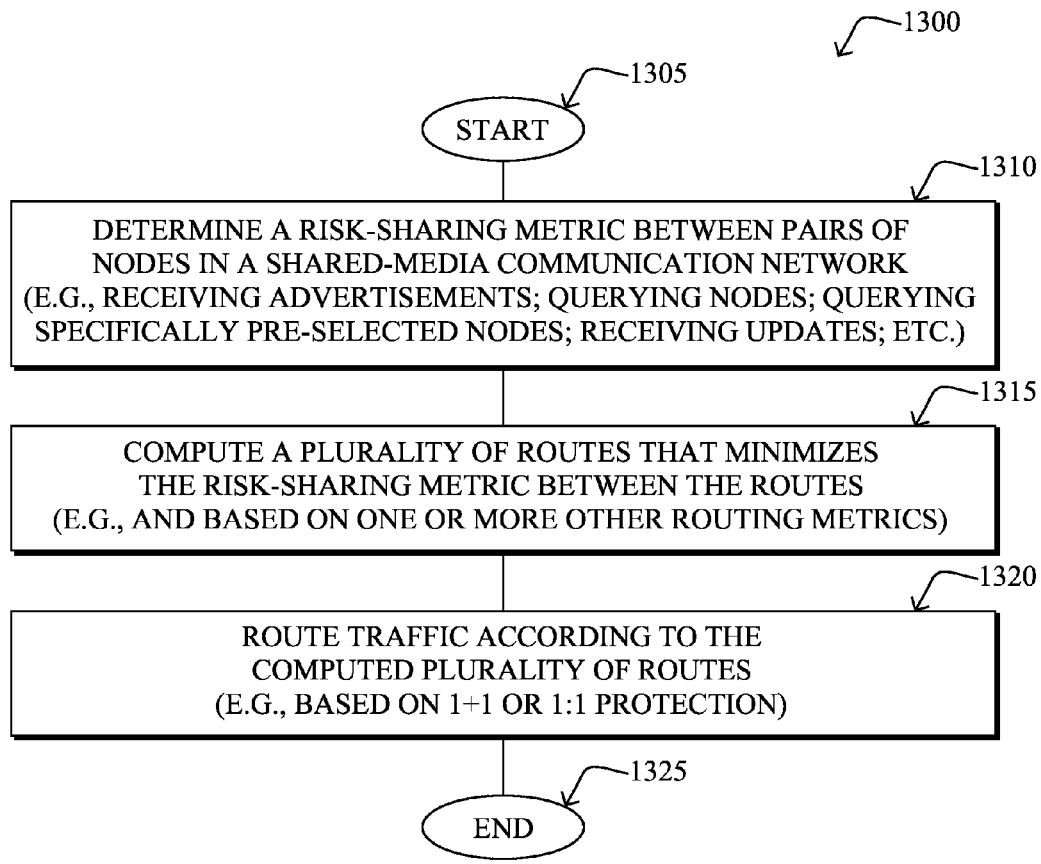
FIG. 13 illustrates an example simplified procedure for use with risk-sharing metrics in a shared-media communication network, from the perspective of a routing node.

FIG. 13 illustrates an example simplified procedure for use with risk-sharing metrics in a shared-media communication network in accordance with one or more embodiments described herein, from the perspective of a routing node. The procedure 1300 may start at step 1305, and continues to step 1310, where, as described in greater detail above, the routing node (e.g., node 33) determines a risk-sharing metric between pairs of nodes in a shared-media communication network. For example, such a determination may be based on receiving advertisements, querying nodes, querying specifically pre-selected nodes, receiving updates, etc., each as described above. In step 1315, the routing device may then compute a plurality of routes that minimizes the risk-sharing metric between the routes (e.g., and based on one or more other routing metrics), such that in step 1320, traffic may be routed according to the computed plurality of routes (e.g., based on 1+1 or 1:1 protection). The procedure 1300 illustratively ends in step 1325.

Figure 14:
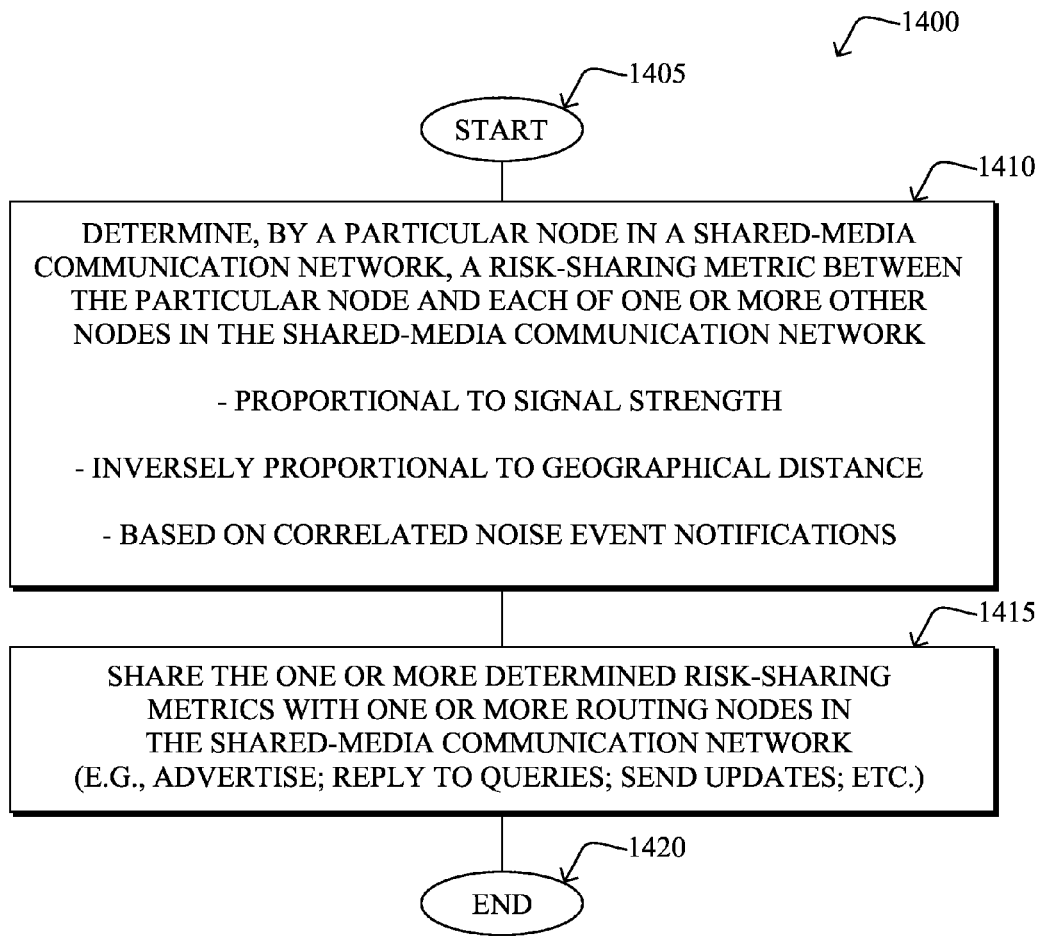
FIG. 14 illustrates an example simplified procedure for use with risk-sharing metrics in a shared-media communication network, from the perspective of a node sharing its risk-sharing metrics.

In addition, FIG. 14 illustrates an example simplified procedure for use with risk-sharing metrics in a shared-media communication network in accordance with one or more embodiments described herein, from the perspective of a node sharing its risk-sharing metrics. The procedure 1400 may start at step 1405, and continues to step 1410, where, as described in greater detail above, a particular node (e.g., node 23) in a shared-media communication network determines a risk-sharing metric between the particular node and each of one or more other nodes in the shared-media communication network (e.g., its neighbors, n-hop neighbors, etc.). Notably, as detailed above, the risk-sharing metric may be determined based on computed values that are proportional to signal strength (e.g., RSSI), inversely proportional to geographical distance (e.g., GPS coordinates or other locator value), or else that are based on correlated noise event notifications. In step 1415, the particular node shares the one or more determined risk-sharing metrics with one or more routing nodes in the shared-media communication network as described above, such as by advertising the metric, replying to queries, sending updates, etc. The procedure 1400 may then end in step 1420.

Figure 15:
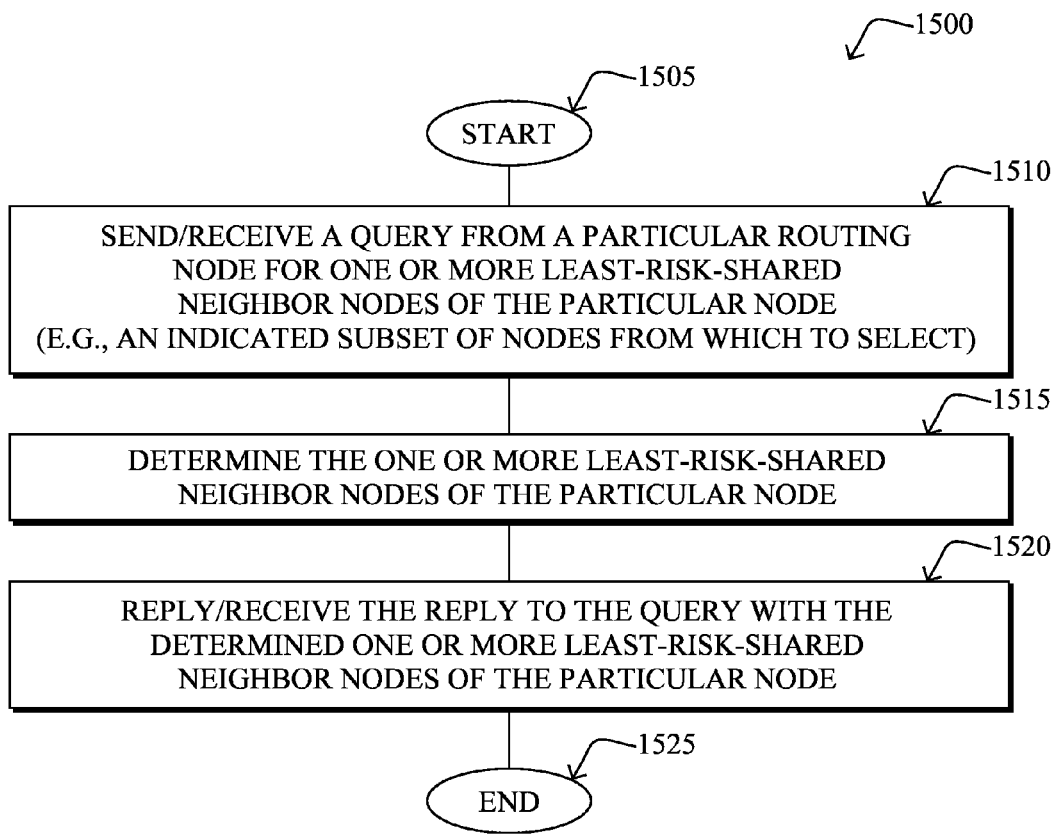
FIG. 15 illustrates an example simplified procedure for use with risk-sharing metrics in a shared-media communication network, particularly where delegating least-risk-shared decisions.

Moreover, FIG. 15 illustrates an example simplified procedure for use with risk-sharing metrics in a shared-media communication network in accordance with one or more embodiments described herein, particularly where delegating least-risk-shared decisions. The procedure 1500 may start at step 1505, and continues to step 1510, where, as described in greater detail above, a query is sent/received (depending upon device perspective) from a particular routing node for one or more least-risk-shared neighbor nodes of the particular node (e.g., an indicated subset of nodes from which to select). The receiving device then determine the one or more least-risk-shared neighbor nodes of the particular node in step 1515, and the reply to the query is sent to/received at the requesting device in step 1520 with the determined one or more least-risk-shared neighbor nodes of the particular node. The procedure 1500 may then illustratively end in step 1525.

It should be noted that while certain steps within procedures 1300-1500 may be optional as described above, the steps shown in FIGS. 13-15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1300-1500 are described separately, certain steps from each procedure may be incorporated into each other procedure, and the procedures are not meant to be mutually exclusive.

The techniques described herein, therefore, provide for risk-sharing metrics in a shared-media communication network. In particular, the techniques herein effectively compute the risk-sharing metric, and use the risk-sharing metric to perform an appropriate routing selection, thus alleviating the tendency of a node selecting next-hops with a high degree of risk sharing, whether for diverse paths or for general routing topology creation. In this manner, the techniques herein increase the robustness of the network. It is also worth mentioning that improper selection of a next-hop with high risk-sharing may lead to isolated sub-networks, thus triggering a very costly repair process of the network.

Note that the notion of Shared Link Risk Groups (SRLGs) has been used in IP/MPLS networks with IGP extensions to report that some links were sharing the same components of an infrastructure. For example, a set of links may share the same fiber (e.g., using DWDM) and thus the failure of such fiber may affect all links. Knowing the SRLG would help not using a link, n, along a back-up path used to protect a link, m, sharing a common SRLG. The problem in shared-media networks, however, is quite different since the risk-sharing is dynamic and non-deterministic, making the problem much more difficult. That is, the notion of a "shared link" is different: in IP/MPLS networks, a shared link is a physically shared medium, such that if a shared link fails (such as a fiber) all links sharing that link (fiber) fail. By contrast, shared risk in a shared-media communication network is based on interference, such that increased noise on shared wireless or PLC links may generally only affect a subset of these links to the point of failure.

While there have been shown and described illustrative embodiments that provide for risk-sharing metrics in a shared-media communication network, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of shared-media networks and/or protocols. In addition, while certain protocols are shown, such as RPL, other suitable protocols may be used, accordingly. Also, while the techniques generally describe distributed computation of the risk-sharing metrics on the individual nodes of the network, a head-end node such as the root node, a network management system/server (NMS), etc., may also be used to provide the appropriate risk-sharing computation or path/route computation, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a node, a risk-sharing metric between pairs of nodes in a shared-media communication network, wherein the shared-media communication network is a wireless network or a Power Line Communication (PLC) network and the risk-sharing metric is received from each neighboring node of the pairs of nodes and includes information related to at least geographical position and signal strength that conveys how likely two or more devices in the shared-media communication network are affected by same sources of internal or external interference, wherein the risk-sharing metric for each pair of nodes comprises a value proportional to the signal strength, a value inversely proportional to a corresponding geographical distance determined using the geographical position, or a combination of both;
   computing a plurality of routes that minimizes the risk-sharing metric between the routes; and
   routing traffic according to the computed plurality of routes.

2. The method as in claim 1, wherein determining comprises:
   receiving one or more advertisements from one or more nodes in the shared-media communication network, the advertisements relaying the associated risk-sharing metric between corresponding pairs of neighbor nodes of the respective node sending the advertisement.

3. The method as in claim 1, wherein determining comprises:
 querying one or more nodes for their locally determined risk-sharing metrics between pairs of their neighbor nodes.

4. The method as in claim 3, further comprising:
 selecting a preferred node for a first computed route; and
 querying the preferred node for its locally determined risk-sharing metrics between pairs of its neighbor nodes.

5. The method as in claim 1, further comprising:
 receiving an update to the risk-sharing metric between a particular pair of nodes in response to that risk-sharing metric changing by a threshold amount.

6. The method as in claim 1, wherein determining comprises:
 querying one or more nodes for one or more of their locally determined least-risk-shared neighbor nodes.

7. The method as in claim 6, wherein querying comprises:
 indicating a select subset of nodes from which the queried nodes are to select their locally determined least-risk-shared neighbor nodes.

8. The method as in claim 1, wherein computing comprises:
 utilizing one or more routing metrics in addition to the risk-sharing metric when computing the plurality of routes.

9. The method as in claim 1, wherein routing traffic comprises:
 utilizing a protection scheme selected from 1+1 protection and 1:1 protection.

10. A method, comprising:
 determining a risk-sharing metric between a particular node and each of one or more other nodes in a shared-media communication network, wherein the shared-media communication network is a wireless network or a Power Line Communication (PLC) network and the risk-sharing metric is received from each neighboring node of the pairs of nodes and includes information related to at least geographical position and signal strength that conveys how likely two or more devices in the shared-media communication network are affected by same sources of internal or external interference, wherein the risk-sharing metric for each pair of nodes comprises a value proportional to the signal strength, a value inversely proportional to a corresponding geographical distance determined using the geographical position, or a combination of both; and
 sharing the one or more determined risk-sharing metrics with one or more routing nodes in the shared-media communication network.

11. The method as in claim 10, wherein sharing comprises:
 sending one or more advertisements from the particular node to the one or more routing nodes.

12. The method as in claim 10, wherein sharing comprises:
 replying to a query from the one or more routing nodes.

13. The method as in claim 10, further comprising:
 sending an update for a particular risk-sharing metric of the one or more determined risk-sharing metrics in response to that risk-sharing metric changing by a threshold amount.

14. The method as in claim 10, wherein sharing comprises:
 receiving a query from a particular routing node for one or more least-risk-shared neighbor nodes of the particular node;
 determining the one or more least-risk-shared neighbor nodes of the particular node; and
 replying to the query with the determined one or more least-risk-shared neighbor nodes of the particular node.

15. The method as in claim 14, wherein the received query indicates a select subset of nodes from which the particular node is to select its least-risk-shared neighbor nodes.

16. The method as in claim 10, wherein determining comprises:
 receiving one or more noise event notifications from each of the one or more other nodes; and
 determining the risk-sharing metric for each other node by correlating the noise event notifications.

17. The method as in claim 10, wherein the one or more other nodes are determined as a set of nodes selected from a group consisting of: next-hop neighbor nodes; n-hop neighbor nodes; reachable neighbor nodes; and all nodes of the communication network.

18. The method as in claim 10, further comprising:
 determining a risk-sharing metric between pairs of the one or more other nodes in the shared-media communication network;
 computing a plurality of routes that minimizes the risk-sharing metric between the routes; and
 routing traffic according to the computed plurality of routes.

19. An apparatus, comprising:
 one or more network interfaces to communicate in a shared-media communication network, wherein the shared-media communication network is a wireless network or a Power Line Communication (PLC) network;
 a processor coupled to the network interfaces and adapted to execute one or more processes; and
 a memory configured to store a process executable by the processor, the process when executed operable to:
  determine a risk-sharing metric between pairs of nodes in the shared-media communication network, wherein the risk-sharing metric is received from each neighboring node of the pairs of nodes and includes information related to at least geographical position and signal strength that conveys how likely two or more devices in the shared-media communication network are affected by same sources of internal or external interference, wherein the risk-sharing metric for each pair of nodes comprises a value proportional to the signal strength, a value inversely proportional to a corresponding geographical distance determined using the geographical position, or a combination of both;
  compute a plurality of routes that minimizes the risk-sharing metric between the routes; and
  route traffic according to the computed plurality of routes.

20. An apparatus, comprising:
 one or more network interfaces to communicate in a shared-media communication network, wherein the shared-media communication network is a wireless network or a Power Line Communication (PLC) network;
 a processor coupled to the network interfaces and adapted to execute one or more processes; and
 a memory configured to store a process executable by the processor, the process when executed operable to:
  determine a risk-sharing metric between the apparatus and each of one or more other nodes in the shared-media communication network, wherein the risk-sharing metric is received from each neighboring node of the pairs of nodes and includes information related to at least geographical position and signal strength that conveys how likely two or more devices in the shared-media communication network are affected by same sources of internal or external interference, wherein the risk-sharing metric for each pair of nodes comprises a value proportional to the signal strength, a value inversely proportional to a corresponding geographical distance determined using the geographical position, or a combination of both;

share the one or more determined risk-sharing metrics with one or more routing nodes in the shared-media communication network.

\* \* \* \* \*